(12) United States Patent
Zhang

(10) Patent No.: US 9,373,103 B2
(45) Date of Patent: Jun. 21, 2016

(54) APPARATUS AND METHOD FOR MANAGING LONG-TERM PLAN BY AN E-CALENDAR

(75) Inventor: Ga Zhang, Nanjing (CN)

(73) Assignee: Samsung Electronics Co., Ltd (KR)

( * ) Notice: Subject to any disclaimer, the term of this patent is extended or adjusted under 35 U.S.C. 154(b) by 261 days.

(21) Appl. No.: 13/404,730

(22) Filed: Feb. 24, 2012

(65) Prior Publication Data

US 2012/0221948 A1    Aug. 30, 2012

(30) Foreign Application Priority Data

Feb. 24, 2011  (CN) .......................... 2011 1 0048073
Feb. 6, 2012   (KR) ........................ 10-2012-0011706

(51) Int. Cl.
*G06F 17/00*  (2006.01)
*G06Q 10/10*  (2012.01)
*G06F 15/02*  (2006.01)
*G06F 17/30*  (2006.01)

(52) U.S. Cl.
CPC .......... *G06Q 10/109* (2013.01); *G06F 15/0266* (2013.01); *G06F 17/30268* (2013.01); *G06F 17/30867* (2013.01)

(58) Field of Classification Search
CPC ................... G06F 17/30867; G06F 17/30268; G06F 15/0266
USPC ....................................................... 715/273
See application file for complete search history.

(56) References Cited

U.S. PATENT DOCUMENTS

| | | | |
|---|---|---|---|
| 6,442,527 B1 | 8/2002 | Worthington | |
| 6,463,463 B1 | 10/2002 | Godfrey et al. | |
| 2002/0194246 A1* | 12/2002 | Moskowitz et al. | 709/102 |
| 2005/0004824 A1 | 1/2005 | Sheffler et al. | |
| 2007/0106931 A1 | 5/2007 | Vartiainen et al. | |
| 2009/0089133 A1* | 4/2009 | Johnson et al. | 705/9 |

FOREIGN PATENT DOCUMENTS

| | | |
|---|---|---|
| CN | 1484800 | 3/2004 |
| CN | 101305340 | 11/2008 |
| CN | 101917471 | 12/2010 |
| CN | 101968792 | 2/2011 |
| JP | 2002-118637 | 4/2002 |

OTHER PUBLICATIONS

"A Smart Calendar Application for Mobile Environments," Gkekas et al., 2007, Mobimedia, p. 1-5.*
Chinese Office Action dated Jun. 3, 2013 issued in counterpart application No. 201110048073.4.

* cited by examiner

*Primary Examiner* — Andrew McIntosh
(74) *Attorney, Agent, or Firm* — The Farrell Law Firm, P.C.

(57) ABSTRACT

Provided is a method for managing a long-term plan by an e-calendar, including creating a plan and setting the keyword with respect to the plan, by a user, and pushing related information to the user when an event related to the keyword occurs.

12 Claims, 4 Drawing Sheets

APPARATUS AND METHOD FOR MANAGING LONG-TERM PLAN BY AN E-CALENDAR

PRIORITY

This application claims priority under 35 U.S.C. §119(a) to a Chinese Patent Application filed in the State Intellectual Property Office of the People's Republic of China on Feb. 24, 2011 and assigned Serial No. 201110048073.4 and a Korean Patent Application filed in the Korean Intellectual Property Office on Feb. 6, 2012 and assigned Serial No. 10-2012-0011706, the contents of each of which are incorporated herein by reference.

BACKGROUND OF THE INVENTION

1. Field of the Invention

The present invention relates generally to an e-calendar, and more particularly, to a method for managing a long-term plan by an e-calendar used in the portable terminal, such as mobile phone or a tablet Personal Computer (PC).

2. Description of the Related Art

The main schedule management of conventional e-calendars is for establishing events, including title, starting and ending time, and alarm time of the event, and the user is prompted when reaching the alarm time. The conventional e-calendars are mainly used for short-term scheduling and reminders, which cannot be combined with long-term planners. Thus, the conventional e-calendar fails to optimize online real-time information to help users create short and long-term plans and schedules.

The software Project for managing project progress decomposes the phases within the project cycle and establishes dependency, and the subsequent step cannot be performed until the previous step is completed. If the previous step is deferred, the subsequent steps are deferred accordingly. Such a professional management tool as Project is mainly aimed at project cycle management, which requires strict dependence on each link and the order cannot be reversed within the project cycle. However, since people's schedules and projects are very different, the schedule cannot be managed by Project. In addition, Project is programmed for professional use, and is not easily used by laypersons.

Accordingly, there is a need in the art for an easy-to-use e-calendar that can arrange short-term schedules and manage long-term plans.

SUMMARY OF THE INVENTION

An object of the present invention is to provide a method for managing a long-term plan by an e-calendar.

According to an aspect of the present invention, a method for managing long-term plan by an e-calendar includes creating, by a user, a plan and setting a keyword with respect to the plan, and pushing related information to the user when an event related to the keyword occurs.

A method for managing long-term plan by an e-calendar includes creating, by a user, a plan and setting a keyword with respect to the plan, setting a strength of the association of an event and the plan when the event is created by the user, and calculating the devotion intensity and concentration degree on the plan of the user based on the strength of the association of the plan, so as to analyze the plan implementation.

BRIEF DESCRIPTION OF THE DRAWINGS

The above and other objects of the present invention will become more apparent by describing with reference to the accompanying drawings, in which.

DETAILED DESCRIPTION OF EMBODIMENTS OF THE INVENTION

Embodiments of the present invention will now be described in detail with reference to the accompanying drawings. In the following description, specific details such as detailed configuration and components are merely provided to assist the overall understanding of embodiments of the present invention. Therefore, it should be apparent to those skilled in the art that various changes and modifications of the embodiments described herein can be made without departing from the scope and spirit of the invention. In addition, descriptions of well-known functions and constructions are omitted for the sake of clarity and conciseness.

A portable terminal, to which an embodiment of the present invention is applicable, may include all information/communication devices and multimedia devices, such as digital broadcasting terminals, Personal Digital Assistants (PDAs), smart phones, and $3^{rd}$ Generation (3G) terminals (e.g., International Mobile Telecommunication 2000 (IMT-2000) terminals, Wideband Code Division Multiple Access (WCDMA) terminals, Global System for Mobile communication/General Packet Radio Service (GSM/GPRS) terminals, and Universal Mobile Telecommunication Service (UMTS) terminals. It will be apparent to those skilled in the art that the teachings of the present invention may be applied to any applications for these terminals.

In the calendar according to the present invention, the management and pushing of the long-term plan are achieved by the related latest information being pushed to the user according to the keyword of the plan in real time, enabling efficient creation or amendment of the plan and the activity; and by recording performing statistics and analyzing the strength of association of each activity and the plan, and prompting the user. Through the foregoing, the long-term plan can be managed while managing the short-term schedule.

Figure 1:
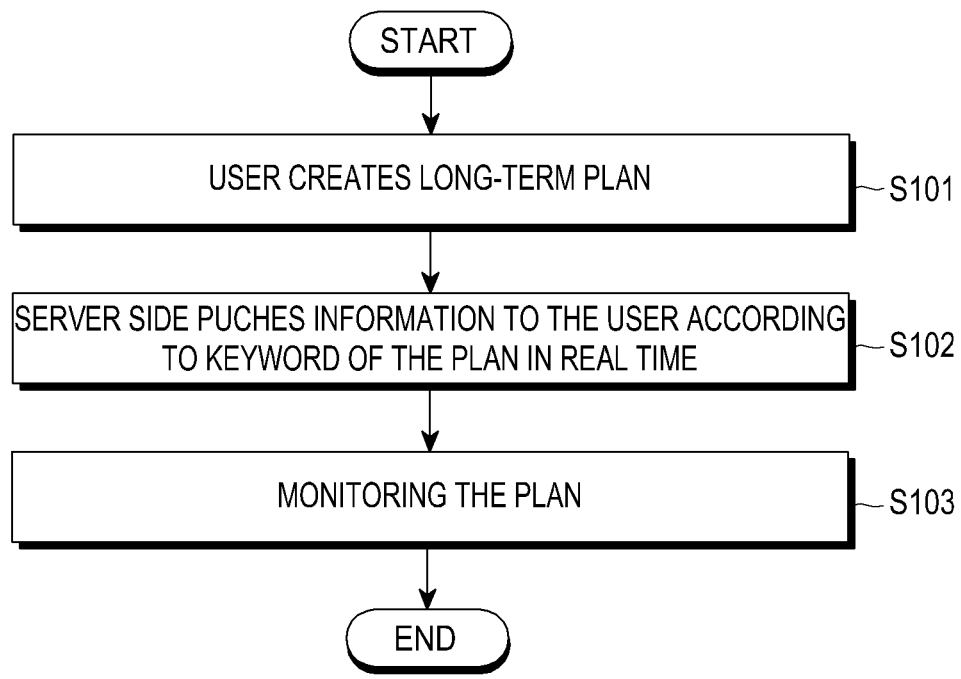
FIG. 1 illustrates an operation of the e-calendar according to an embodiment of the present invention.

FIG. 1 illustrates an operation of the e-calendar according to an embodiment of the present invention.

In step S101, the user turns on the e-calendar, and creates a long-term plan in the e-calendar. Specifically, the user opens a creating plan page on the portable terminal (such as a mobile phone), and fills respective fields in the corresponding block on the page, for example, long-term name, keywords, start and end time of the long-term plan, phase plan name, start and end time of the phase plan, keyword of the phase plan, and reminder period of the plan, which indicates the time when the user conveniently receives the plan reminder, An example of the reminder period is a certain time per day or per week, which is saved by the portable terminal after being set by the user.

In step S102, the server side pushes information to the user according to a keyword of the plan in real time. The system of the e-calendar according to the present invention can be realized in Comet architecture. Comet is a modern Web application architecture, in which the server side may actively push data to the client program, which is usually a browser, in an asynchronous manner without an obvious request issued by the client side. Comet architecture is fit for the Web application and is driven by an event and application that require strong interactivity and real-time, such as stock market analysis, chat rooms and online Web games.

Specifically, in Comet architecture, when the plan is saved, the client side, i.e. the portable terminal registers the keyword of the plan and the pushing period information with the server side. When detecting an event related to the keyword of the plan, the server side determines whether the current time is within the reminder period of the plan, and if so, the server side pushes the event information to the user. Otherwise, the server side does not push the event information to the user until the reminder period of the plan is reached.

Figure 2:
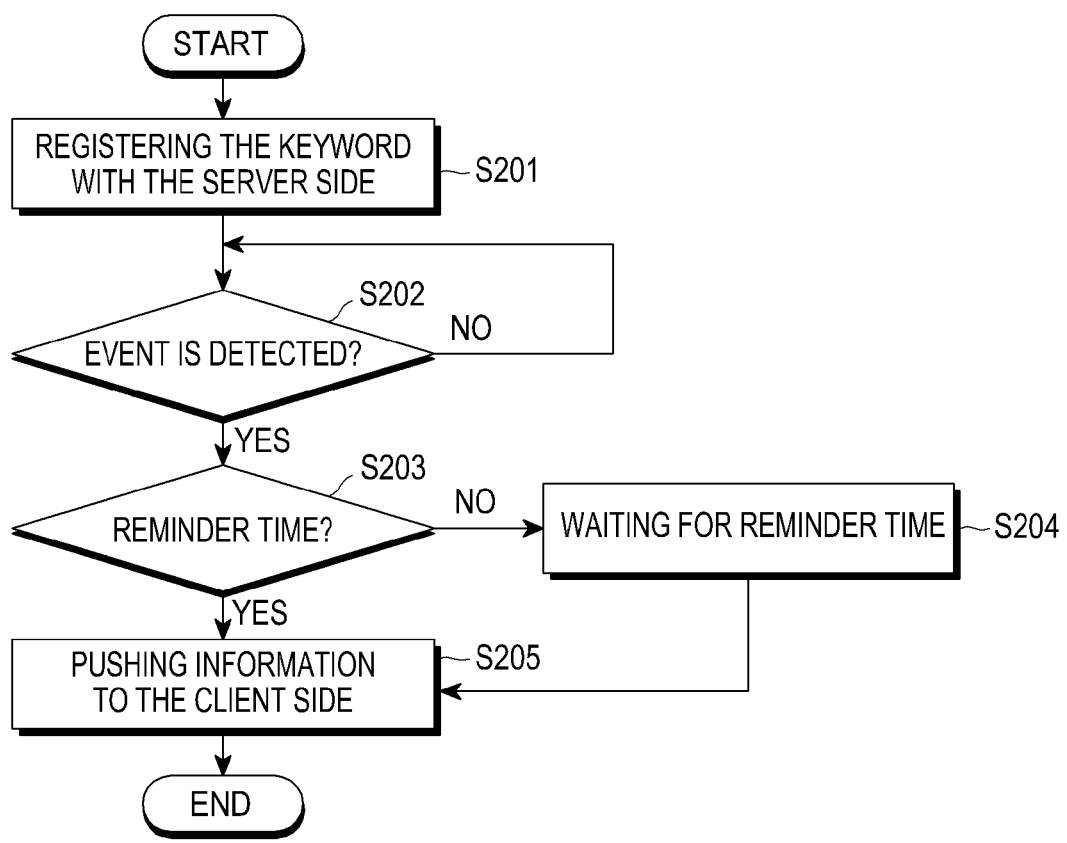
FIG. 2 illustrates an operation for pushing related information according to the plan keyword.

The detailed procedure of an operation for pushing related information according to the plan keyword will be described in detail below with reference to FIG. 2.

In step S201, the client side registers the keyword and the reminder period of the plan input to the creating plan page with the server side.

In step S202, the server side detects whether a related event occurs, that is, whether related activity schedule exists. When a related event is detected, in step S203, the server side checks whether the current time is within the reminder period of the plan. If the current time is within the reminder period of the plan, the server side pushes the event information to the client side in step S205. Otherwise, the server does not push the event information to the client side until the reminder period of the plan is reached (steps S204 and S205).

According to another aspect of the present invention, the portable terminal may perform a monitoring step with respect to the plan monitoring in S103. In the monitoring step with respect to the plan implementation, the strength of association of the event and the plan is set when the user creates the event, and the portable terminal calculates a devotion intensity and a concentration degree according to the strength of association with the plan, thereby analyzing the plan implementation.

Figure 3:
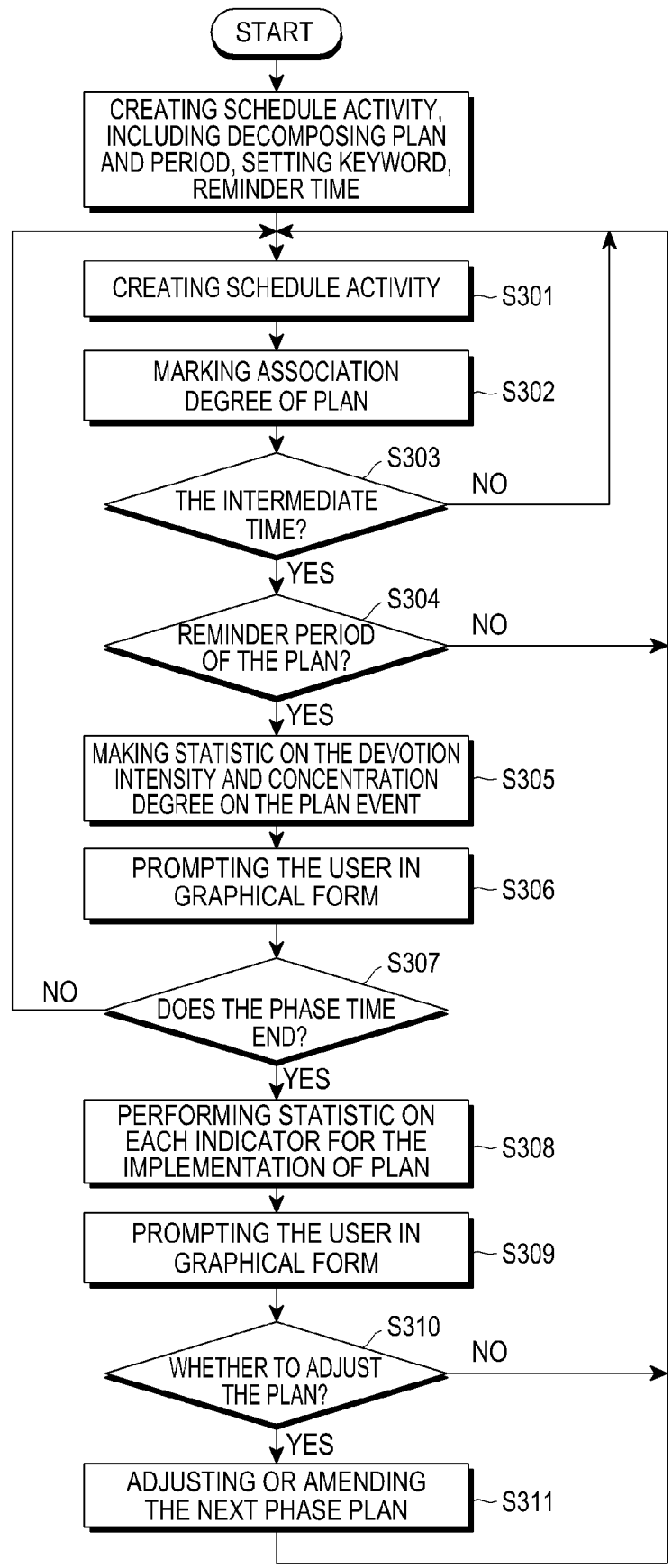
FIG. 3 illustrates a monitoring operation with respect to the plan implementation.

The monitoring operation with respect to the plan implementation S103 will be described in detail below with reference to FIG. 3.

In step S301, the user creates an event, that is, schedules activity.

In step S302, the user then sets the association degree (i.e. strength of the association) of the event and the phase plan. The strength of the association may be divided into strong, medium and weak. If the event created by the user is important to the implementation of the phase plan, the strength of the association is strong and the corresponding value is 1. If the event relates to the implementation of the phase plan, but is not of great importance, the strength of the association is medium and the corresponding value is 0.5. If the event is not important to or does not relate to the implementation of the phase plan, the strength of the association is weak and the corresponding value is 0.

An intermediate time point of one phase is calculated by the start time of the phase plan and the end time of the phase plan. In step S303, the portable terminal determines whether the current time reaches (i.e., is the same as) the intermediate time point of one phase. If reached, the portable terminal determines whether the intermediate time point is within the reminder period of the plan in step S304. If the intermediate time point is within the reminder period of the plan, the portable terminal calculates the devotion intensity and concentration degree on the event in step S305.

The portable terminal analyzes the plan implementation by calculating the devotion intensity and concentration degree. The devotion intensity indicates the intensity of the associated event within the unit time, and concentration degree indicates the ratio of the time taken by all the associated events to the time taken by the non-associated events.

The devotion intensity ω is calculated by the following Equation (1).

$$\omega = \frac{\sum_{i=1}^{n} [\partial_i \times (\text{event\_end\_time}_i - \text{event\_start\_time}_i)]}{\text{phase\_end\_time} - \text{phase\_start\_time}} \times \theta \quad (1)$$

In Equation (1), n is the total number of events, and is a natural number greater than or equal to 1, $\partial_i$ is the strength of association of event i, event_end_time$_i$ is the end time of event i, event_start_time$_i$ is the start time of event i, phase_end_time is the end time of phase plan, phase_start_time is the start time of phase plan, and θ is a weighting factor, and its value is 12.

The concentration degree φ is calculated by the following Equation (2).

$$\varphi = \frac{\sum_{i=1}^{l} [\partial_i \times (\text{event\_with\_end\_time}_i - \text{event\_with\_start\_time}_i)]}{\sum_{j=1}^{m} (\text{event\_without\_end\_time}_j - \text{event\_without\_start\_time}_j)} \quad (2)$$

In Equation (2), event i represents a associated event, event j represents a non-associated event, l is the total number of the associated events and is a natural number greater than or equal to 1, m is the total number of the non-associated events and is a natural number greater than or equal to 1, $\partial_i$ is the strength of association of event i, event_with_end_time$_i$ is the end time of event i; event_with_start_time$_i$ is the start time of event i, event_without_end_time$_j$ is the end time of the non-associated event j, and event_without_start_time$_j$ is the start time of the non-associated event j.

In step S306, the portable terminal prompts the user with the calculated devotion intensity and concentration degree in graphical form. If ω<0.5, the portable terminal prompts the user that the time is half passed and the effort on the implementation of the plan is not enough, and prompts the user to please earnestly implement the plan. If ω>0.5 and φ<0.5, then the portable terminal prompts the user that more than a half effort has been applied on the non-associated event with the plan, and prompts the user to adjust the plan and apply more effort on the associated event with the plan. If the current time is not within the reminder period, the portable terminal does not prompt the user until the reminder time is reached.

When the phase time ends in step S307, the portable terminal performs statistics on each indicator for the implementation of the plan in step S308, such as by calculating the ratio of the time taken by all the events to the phase time, the ratio of the time taken by the events associated with the plan to the phase time, the ratio of the time taken by the events non-associated with the plan to the phase time, and the devotion intensity ω and concentration degree φ. The portable terminal prompts the indicators to the user in graphical form in step S309, and enables the user to learn the implementation of the plan according to the indicated values, and to determine whether to adjust and arrange the next phase plan in step S310. During the implementation of the plan, the user may adjust or cancel the plan according to the implementation case or new information in step S311. When the plan is not completed at the due date, the user is prompted whether the plan is deferred or cancelled, and if the user selects canceling of the plan, the user will not be prompted with respect to the plan.

Steps S102 and S103 are individually implemented on the portable terminal, and thus do not limit to the sequence described in FIG. 1.

In the multi-plan, every event is created with respective plan to obtain the strength of association. Each plan is set individually. When a plurality of plans are set, the devotion intensity is calculated in the manner described above, and the concentration degree is calculated by subtracting the time taken by other plans from the compared time, i.e. the denominator.

The e-calendar according to the present invention can also push related information to the user according to the keyword of the plan in real time, allow the user to set or adjust the plan and arrange or adjust the schedule according to the latest information related to the plan, and enable the user to efficiently monitor the implementation of the plan by statistics and analysis of the strength of the association of the activity per piece of data and the long-term plan.

Figure 4:
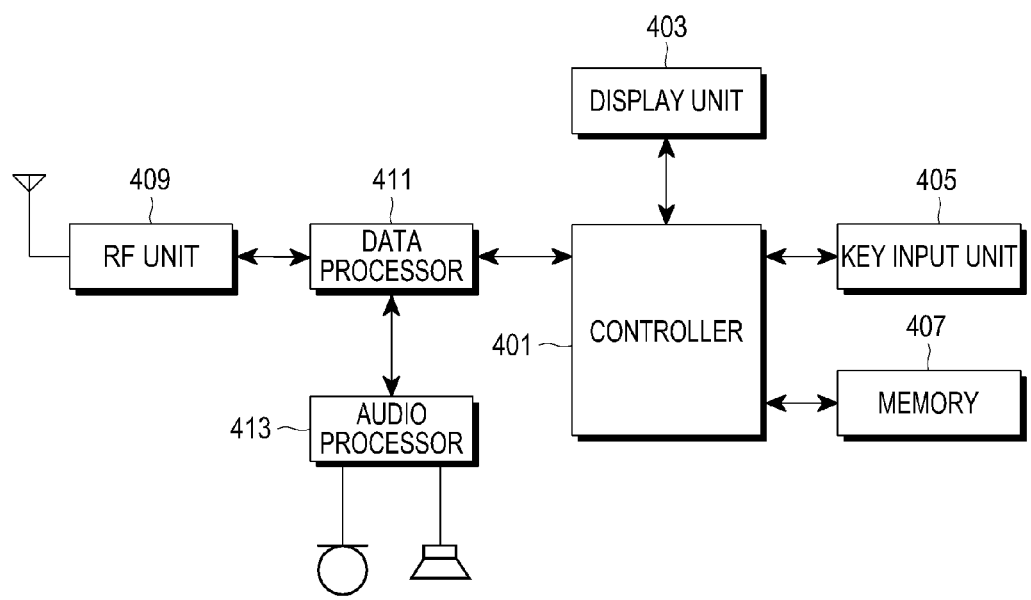
FIG. 4 illustrates a portable terminal with a touch screen according to an embodiment of the present invention.

FIG. 4 illustrates a portable terminal with a touch screen according to an embodiment of the present invention.

Referring to FIG. 4, a portable terminal includes a controller 401, a display unit 403, a key input unit 405, a memory 407, a Radio Frequency (RF) unit 409, a data processor 411, and an audio processor 413.

The RF unit 409 may include an RF transmitter (not shown) for upconverting the frequency of a transmission signal and amplifying the upconverted transmission signal and an RF receiver (not shown) for low-noise-amplifying a received signal and downconverting the frequency of the low-noise-amplified signal. The data processor 411 includes a MODEM (not shown). The MODEM may include a transmitter for encoding and modulating the transmission signal and a receiver for demodulating and decoding the signal received from the RF unit 409.

The audio processor 413 may include a CODEC (not shown) comprised of a data CODEC and an audio CODEC. The data CODEC processes packet data and the audio CODEC processes voice and an audio signal of a multimedia file. The audio processor 413 may reproduce a digital audio signal received from the MODEM by converting the digital audio signal to an analog signal through the audio CODEC or may convert an analog audio signal generated from a microcomputer to a digital audio signal through the audio CODEC and transmit the digital audio signal to the MODEM. While the CODEC has been described as included in the audio processor 413, the CODEC may be configured separately or incorporated into the controller 401.

The key input unit 405, or keypad, may include alphanumeric keys for entering numbers and characters and function keys for setting various function, or a touchpad. If the display unit 403 is configured with a capacitive or resistive touch screen, the key input unit 405 may include a minimum number of keys and the display unit 403 may comprise a part of the key input function of the key input unit 405.

The memory 407 may include a program memory and data memories. The program memory stores a program for controlling the typical functions of the portable terminal. The memory 407 may further include an external memory such as a Compact Flash (CF), a Secure Digital (SD), a Micro Secure Digital (Micro-SD), a Mini Secure Digital (Mini-SD), an Extreme Digital (xD), and a memory stick. The memory 407 may include a disk such as a Hard Disk Drive (HDD) and a Solid State Disk (SSD). The memory 407 stores the history of a service that the portable terminal has executed, upon request of the controller 401 and retrieves the stored service history upon request of the controller 401.

The display unit 403 may be configured with a Liquid Crystal Display (LCD) or an Organic Light Emitting Diode (OLED) (e.g. a Passive-Matrix OLED (PMOLED) or Active-Matrix OLED (AMOLED)). The display unit 403 outputs various types of display information generated in the portable terminal. The display unit 403 may include a capacitive or resistive touch screen, to thereby serve as an input unit for controlling the portable terminal, along with the keypad 405.

The controller 401 provides overall control to the portable terminal. The controller 401 may switch and control an operation of the portable terminal according to a user input received through the key input unit 405 or the display unit 403.

Particularly, the controller 401 may perform a monitoring operation with respect to the plan implementation, in which monitoring operation the strength of association of the event and the plan is set when the user creates the event, and the controller 401 calculates a devotion intensity and a concentration degree according to the strength of association with the plan, thereby analyzing the plan implementation.

The monitoring operation will be described in detail below. The controller 401 creates an event when a user inputs the event, that is, schedule activity, and receives the association degree (i.e. strength of the association) of the event and the phase plan from the user. The strength of the association may be divided into strong, medium and weak. If the event created by the user is important to the implementation of the phase plan, the strength of the association is strong and the corresponding value is 1. If the event relates to the implementation of the phase plan, but is not considered important, the strength of the association is medium and the corresponding value is 0.5. If the event is not important to or does not relate to the implementation of the phase plan, the strength of the association is weak and the corresponding value is 0.

The controller 401 determines whether the current time reaches an intermediate time point of one phase, which is calculated by the start time and the end time of the phase plan. If reached, the controller 401 determines whether the intermediate time point is within the reminder period of the plan in operation. If the intermediate time point is within the reminder period of the plan, the controller 401 calculates the devotion intensity and concentration degree on the event in operation.

The controller 401 analyzes the plan implementation by calculating the devotion intensity and concentration degree. The devotion intensity indicates the intensity of the associated event within the unit time, and concentration degree indicates the ratio of the time taken by all the associated events to the time taken by the non-associated events.

The devotion intensity $\omega$ is calculated by Equation (1), and the concentration degree $\phi$ is calculated by Equation (2).

The controller 401 prompts the user with the calculated devotion intensity and concentration degree in graphical form. If $\omega<0.5$, then the controller 401 prompts the user that the time is half passed, the effort on the implementation of plan is not enough, and prompts the user to earnestly implement the plan. If $\omega>0.5$ and $\phi<0.5$, then the controller 401 prompts the user that more than a half effort has been applied on the non-associated event with the plan, and to adjust the plan and apply more effort on the associated event with the plan. If the current time is not within the reminder period, the controller 401 does not prompt the user until the reminder time is reached.

When the phase time ends, the controller 401 performs statistics on each indicator for the implementation of plan, such as by calculating the ratio of the time taken by all the events to the phase time, the ratio of the time taken by the events associated with the plan to the phase time, the ratio of the time taken by the events non-associated with the plan to the phase time, and the devotion intensity ω and concentration degree φ. The controller 401 prompts the indicators to the user in graphical form, and enables the user to learn the implementation of the plan according to the indicator values, and to adjust and arrange the next phase plan accordingly. During the implementation of the plan, the user may adjust or cancel the plan according to the implementation case or new information. When the plan is not completed at the due date, the user will be prompted as to whether the plan is deferred or cancelled, and if the user selects canceling of the plan, the user will not be prompted with respect to the plan.

In a multi-plan, every event is created with respective plan to obtain the strength of association. Each plan is set individually. When a plurality of plans are set, the devotion intensity is calculated in the manner described above, and the concentration degree is calculated by subtracting the time taken by other plans from the compared time, i.e. the denominator.

The e-calendar according to the present invention can also push related information to the user according to the keyword of the plan in real time, enable the user to set or adjust the plan and arrange or adjust the schedule according to the latest information related to the plan; and enable the user to efficiently monitor the implementation of the plan by statistics and analysis of the strength of the association of the activity per piece of data and the long-term plan.

Although the present invention has been shown and described with reference to the embodiments thereof, it would be appreciated by those skilled in the art that changes may be made in form and details without departing from the principles and spirit of the invention defined by the claims.

What is claimed is:

1. A method for managing a long-term plan by an e-calendar, the method comprising:
   creating a long-term plan;
   setting a keyword identifying the long-term plan by a user; and
   determining whether an event related to the keyword occurs; and
   pushing related information of the event to the user when the event related to the keyword occurs;
   setting a strength of an association of the event and the long-term plan, when the event is created by the user;
   determining whether a current time is within a predetermined reminder period; and
   when the current time is within the predetermined reminder period:
      calculating a devotion intensity and concentration degree on the long-term plan, based on the strength of the association of the event and the long-term plan; and
      providing a prompt to the user based upon the calculated devotion intensity and concentration degree,
   wherein the event is an activity schedule related to the long-term plan.

2. The method of claim 1, further comprising;
   setting a reminder time of the long-term plan by the user; and
   providing the related information to the user, when the event related to the keyword occurs and the current time is the same as the reminder time of the long-term plan.

3. The method of claim 1, wherein the devotion intensity ω is calculated by:

$$\omega = \frac{\sum_{i=1}^{n}[\partial_i \times (\text{event\_end\_time}_i - \text{event\_start\_time}_i)]}{\text{phase\_end\_time} - \text{phase\_start\_time}} \times \theta,$$

wherein
   n is a total number of events, and is a natural number greater than or equal to 1,
   $\partial_i$ is the strength of association of the event i and the long-term plan,
   event_end_time$_i$ is an end time of the event i,
   event_start_time$_i$ is a start time of the event i,
   phase_end_time is an end time of a phase plan,
   phase_start_time is a start time of the phase plan, and
   θ is a weighting factor.

4. The method of claim 1, wherein the concentration degree φ is calculated by:

$$\varphi = \frac{\sum_{i=1}^{l}[\partial_i \times (\text{event\_with\_end\_time}_i - \text{event\_with\_start\_time}_i)]}{\sum_{j=1}^{m}(\text{event\_without\_end\_time}_j - \text{event\_without\_start\_time}_j)},$$

wherein
   event i represents an associated event,
   event j represents a non-associated event,
   l is a total number of the associated events and is a natural number greater than or equal to 1,
   m is a total number of the non-associated events and is a natural number greater than or equal to 1,
   $\partial_i$ is the strength of association of event i and the long-term plan,
   event_with_end_time$_i$ is an end time of the associated event i,
   event_with_start_time$_i$ is a start time of the associated event i,
   event_without_end_time$_j$ is an end time of the non-associated event j, and
   event_without_start_time$_j$ is a start time of the non-associated event j.

5. The method of claim 1, further comprising providing information with respect to the event to the user, according to a plan implementation.

6. The method of claim 1, wherein the strength of the association is divided into strong, medium, and weak, and
   when the event is important to an implementation of a phase plan, the strength of the association is strong,
   when the event relates to the implementation of the phase plan, but is not important to the implementation of the phase plan, the strength of the association is medium, and
   when the event is not important to or does not relate to the implementation of the phase plan, the strength of the association is weak.

7. An apparatus for managing a long-term plan by an e-calendar, the apparatus comprising:
   a display device; and
   a controller for
      creating a long-term plan, setting a keyword identifying the long-term plan by a user,
      determining whether an event related to the keyword occurs, displaying related information of the event on the display device when the event related to the keyword occurs, setting a strength of an association of the event and the long-term plan, when the event is created by the user, determining whether a current time is within a predetermined reminder period, and when the current time is within the predetermined reminder period:

calculating a devotion intensity and concentration degree on the long-term plan, based on the strength of the association of the event and the long-term plan, and providing a prompt to the user based upon the calculated devotion intensity and concentration degree, wherein the event is an activity schedule related to the long-term plan.

8. The apparatus of claim 7, wherein the controller sets a reminder time of the long-term plan, and provides the related information on the display device, when the event related to the keyword occurs and the current time is the same as the reminder time of the long-term plan.

9. The apparatus of claim 7, wherein, the devotion intensity $\omega$ is calculated by:

$$\omega = \frac{\sum_{i=1}^{n}[\partial_i \times (\text{event\_end\_time}_i - \text{even\_start\_time}_i)]}{\text{phase\_end\_time} - \text{phase\_start\_time}} \times \theta,$$

wherein n is a total number of events, and is a natural number greater than or equal to 1, $\partial_i$ is the strength of association of event i and the long-term plan, event_end_time$_i$ is an end time of the event i, event_start_time$_i$ is a start time of the event i, phase_end_time is an end time of a phase plan, phase_start_time is a start time of the phase plan, and $\theta$ is a weighting factor.

10. The apparatus of claim 7, wherein, the concentration degree $\phi$ is calculated by:

$$\varphi = \frac{\sum_{i=1}^{l}[\partial_i \times (\text{event\_with\_end\_time}_i - \text{event\_with\_start\_time}_i)]}{\sum_{j=1}^{m}(\text{event\_without\_end\_time}_j - \text{event\_without\_start\_time}_j)},$$

wherein event i represents an associated event, event j represents a non-associated event, l is a total number of the associated events and is a natural number greater than or equal to 1, m is a total number of the non-associated events and is a natural number greater than or equal to 1, $\partial_i$ is the strength of association of event i and the long-term plan, event_with_end_time$_i$ is an end time of the associated event i, event_with_start_time$_i$ is a start time of the associated event i, event_without_end_time$_j$ is an end time of the non-associated event j, and event_without_start_time$_j$ is a start time of the non-associated event j.

11. The apparatus of claim 7, wherein the controller provides information with respect to the event to the user, according to a plan implementation.

12. The apparatus of claim 7, wherein the strength of the association is divided into strong, medium and weak, and when the event is important to an implementation of a phase plan, the strength of the association is strong, when the event relates to the implementation of the phase plan, but is not important to the implementation of the phase plan, the strength of the association is medium, and when the event is not important to or does not relate to the implementation of the phase plan, the strength of the association is weak.

* * * * *